United States Patent [19]

Whitehead

[11] Patent Number: 4,913,580
[45] Date of Patent: Apr. 3, 1990

[54] RELEASABLE CONNECTOR ASSEMBLY

[75] Inventor: Stephen P. Whitehead, Elgin, Ill.

[73] Assignee: Suncast Corporation, Batavia, Ill.

[21] Appl. No.: 314,387

[22] Filed: Feb. 23, 1989

[51] Int. Cl.⁴ .................... F16B 21/00; A44B 11/25
[52] U.S. Cl. .................................. 403/326; 403/353;
403/380; 24/615; 24/701
[58] Field of Search .................. 24/701, 615, 618, 627;
403/353, 380, 329, 326, 321, 339, 409.1, 315,
317, 319

[56] References Cited

U.S. PATENT DOCUMENTS

| Re. 23,510 | 9/1987 | Tisbo et al. . | |
|---|---|---|---|
| 3,156,282 | 11/1964 | Bedford, Jr. . | |
| 3,195,735 | 7/1965 | Jay . | |
| 3,399,911 | 9/1968 | Beisch | 403/329 |
| 3,630,558 | 12/1971 | Andreini | 24/701 X |
| 3,752,553 | 8/1973 | Bildahl et al. | 403/326 X |
| 3,844,000 | 10/1974 | Hedu | 24/615 |
| 3,898,784 | 8/1975 | Sauer et al. . | |
| 4,019,298 | 4/1977 | Johnson, IV . | |
| 4,068,599 | 1/1978 | Sapp et al. . | |
| 4,108,562 | 8/1978 | Collard et al. . | |
| 4,135,837 | 1/1979 | Suttles . | |
| 4,369,553 | 1/1983 | Yuda | 24/618 |
| 4,382,518 | 5/1983 | Bondoux . | |
| 4,536,904 | 8/1985 | Whitehead . | |
| 4,633,549 | 1/1987 | Lovato | 24/615 |
| 4,637,749 | 1/1987 | Jones et al. | 403/380 X |
| 4,689,929 | 9/1987 | Wright . | |
| 4,705,423 | 11/1987 | Smith . | |
| 4,713,865 | 12/1987 | Geldwerth | 24/615 X |
| 4,729,484 | 3/1988 | McConnell . | |

OTHER PUBLICATIONS

Melnor, *Hose Reel Cart Owner's Guide*, Model No. 768, 4/1988.

Primary Examiner—Andrew V. Kundrat
Assistant Examiner—Peter M. Cuomo
Attorney, Agent, or Firm—Fitch, Even, Tabin & Flannery

[57] ABSTRACT

A connector aassembly for releasably joining a first structural member and a second structural member. The connector assembly includes a female connector component carried by the first structural member including a window having first and second ends, an outside surface and an inside surface, a cam wall positioned adjacent the first end and recessed from the outside surface, and a deflector positioned adjacent the second end and the inside surface. The cam wall has a ramp surface which converges with the outside surface away from the second window end. The assembly further includes a male connector component carried by the second structural member. This component includes a male member for reception in the window and a stem joining the male member and the second structural member. The male member is resilient and has a head with an undersurface for riding on the ramp surface along with a tail extending rearwardly from the head. The head and tail have a generally coplanar outside surfaces. Insertion of the head into the window and movement of the head on the cam wall toward the window first end results in the deflector deflecting the tail until the tail moves into the window past the deflector. Then the tail moves toward the outside surface to retain the male member in the window thereby joining the structural members. A method of assembling a portable hose cart including these connectors is also disclosed.

14 Claims, 3 Drawing Sheets

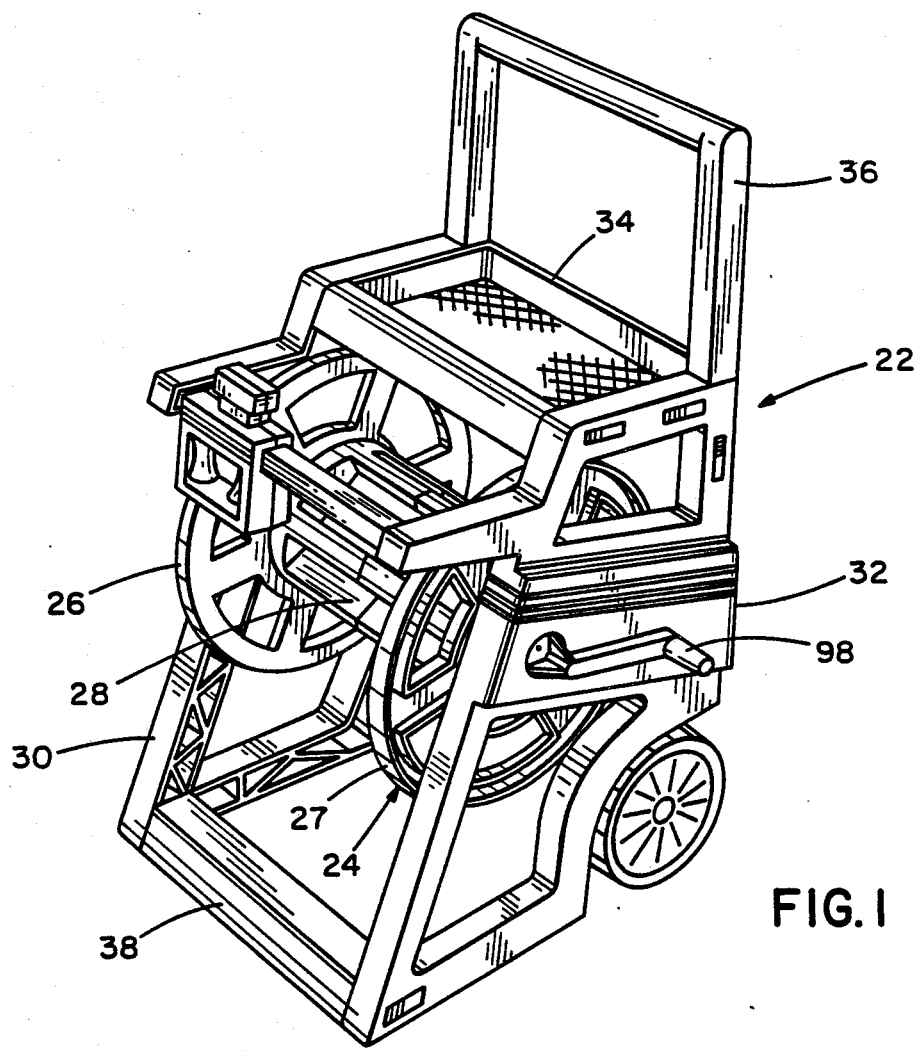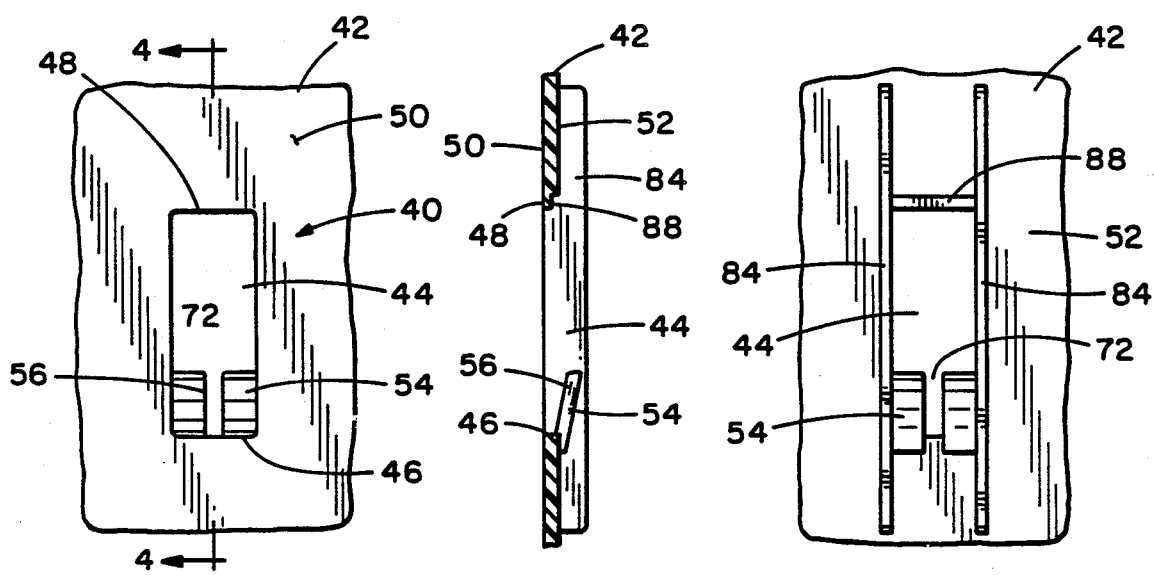

RELEASABLE CONNECTOR ASSEMBLY

This invention relates to connectors and, more particularly, to a releasable connector assembly the components of which are integral with the molded plastic structural members joined by the connector assembly.

BACKGROUND OF THE INVENTION

Portable hose carts for convenient handling and storage of a garden hose have gained wide public acceptance. These carts, which are chiefly made up of molded plastic components, include a rotatable reel for taking up and paying out the hose, a frame supporting the reel, wheels at one end of the base of the frame, and a handle for tilting the frame onto the wheels so that the cart may be easily moved. For more information concerning the structure and operation of such hose carts, reference may be made to commonly-assigned U.S. Pat. Nos. Re. 32,510 and 4,777,976, the teachings of which are hereby incorporated by reference.

While such hose carts perform satisfactorily, there is always room for improvement. As these hose carts are for the general consuming public, it is desirable that the carts can be easily assembled. Commercially available hose carts use threaded fasteners to join major components. The use of such fasteners can be time consuming and requires the use of a simple hand tool.

Various connector assemblies have been proposed for joining two structural members without the use of threaded fasteners. One such assembly includes a female member having a T-shaped aperture. The male member includes a head joined to its structure by a stem for reception in the narrow portion of the aperture. Trailing the head are a pair of resilient fingers for bearing against and biting into the wall in which the aperture is formed. This assembly is made of sheet metal which is subject to rust and the assembled components have exposed sharp edges. For further information concerning the structure and operation of such a prior art assembly, reference may be made to U.S. Pat. No. 3,156,282.

SUMMARY OF THE INVENTION

Among the several aspects and features of the present invention may be noted the provision of an improved connector assembly which is particularly adapted for use in connecting major structural components of a portable hose cart. The components of the connector assembly, which are preferably integral with corresponding structural components, are easily connected and disconnected without the use of tools, thereby making the assembly particularly useful for the home consumer. The assembly components are joined by essentially only effective relative sliding movement between the structural components carrying the components while the components can be disassembled by reversal of such movement after deflection of a latching mechanism, which is easily accomplished using only finger pressure. Once assembled, the connector assembly provides a strong and secure coupling between structural members. The connector assembly of the present invention is reliable in use, has long service life, and is relatively easy and economical to manufacture. Other aspects and features of the present invention will be, in part, apparent and, in part, specifically set forth in the following specification and accompanying drawings.

Briefly, the connector assembly embodying various aspects of the present invention includes a female component supported by a first structural member. This component has a window with a first end and a second end, an outside surface and an inside surface, a cam wall adjacent the first end and recessed from the outside surface, and a deflection means positioned adjacent the second end and the inside surface. The assembly further includes a male connector component including a male member and a stem joining it to the second structural member. The male member is resilient and has a head with an undersurface for riding on the ramp surface and a tail extending rearwardly of the head. Insertion of the head into the window and movement of the head on the cam wall towards the window first end deflects the tail until the tail moves fully into the window. At this time the tail, due to its resiliency, returns towards the outside surface of the female component to retain the male member in the window thereby joining the structural members carrying the connector assembly components.

As a method, the present invention includes the following steps:

(a) The head of the male member is inserted into the window so that the head is aligned to engage the cam wall.

(b) The head is caused to slide up the cam wall until the latching tail moves into the window thereby latching the male and female components together.

(c) When it is desired to disassemble the structural members, the latching tail is pushed out of the window.

(d) The head is caused to slide down the cam wall thereby freeing the components.

BRIEF DESCRIPTION OF THE DRAWINGS

FIG. 1 is a perspective view of a hose cart made up of major structural components releasably joined by connector assemblies embodying various features of the present invention;

FIG. 3 is a plan view of a wall of a first structural component which carries a female connector component of the connector assembly;

FIG. 4 is a sectional view of the female connector component taken generally along line 4—4 of FIG. 3;

FIG. 5 is a bottom view of the female connector component of FIG. 3;

DESCRIPTION OF THE PREFERRED EMBODIMENT

Figure 2:
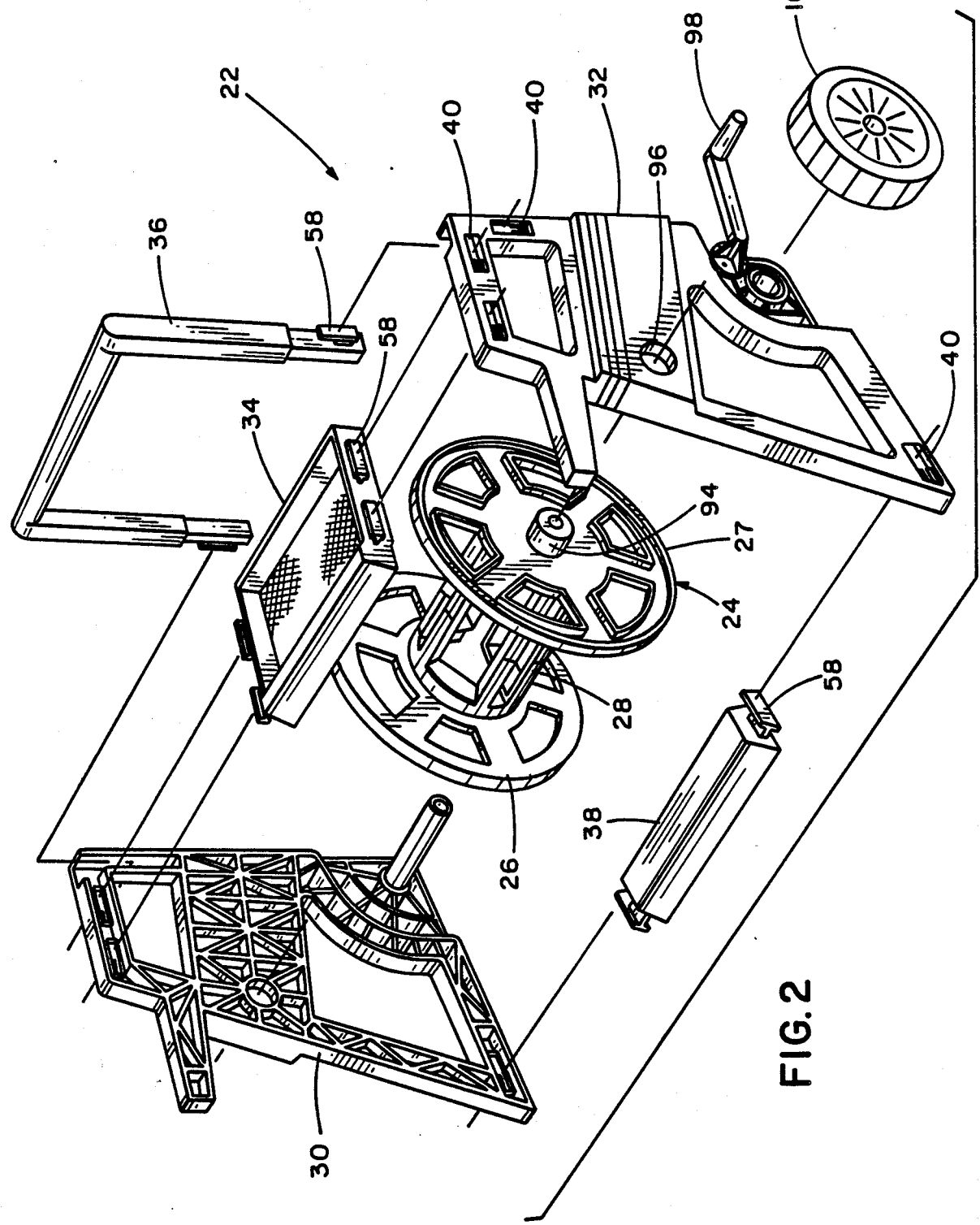
FIG. 2 similar to FIG. 1, is an exploded perspective view of the hose cart structural components.

Referring now to the drawings, a connector assembly 20 for joining a pair of structural components is best shown in FIGS. 9-13. The connector assembly 20 is particularly adapted for use in joining major components of a portable hose cart 22, shown in FIGS. 1 and 2. The cart 22 includes a reel 24 including a pair of spaced reel flanges 26, 27 joined by a spool 28, upon the outer surface of which is wound a garden hose. The cart also includes a pair of generally vertical sides 30, 32 rotatably holding the reel 24, a tray 34, a U-shaped handle 36, and a forward reinforcing bar 38, the last three mentioned components joining the sides. The sides, tray, handle and bar are each preferably of one-piece construction and molded of a thermoplastic material such as polyethylene. Other components of the cart 22 are more fully discussed in U.S. Pat. No. 4,777,976. It will be appreciated that the use of the connector assembly 20 is not limited to a hose cart, and the assembly 20 has general use in joining a pair of structural members.

The connector assembly 10 includes a female connector component 40, best shown in FIGS. 3-5, carried by a wall 42 of a first structural member. The female component 40 includes a window 44, which could be generally rectangular. The window has a first end 46 and a second end 48. The female component also includes an outside surface 50 and an inside surface 52, with a cam wall 54 extending into the window from the first end 46 preferably less than half the distance to the second end 48. A ramp surface 56 on the cam wall is recessed from the outside surface 50 and converges therewith away from the second end.

Figure 6:
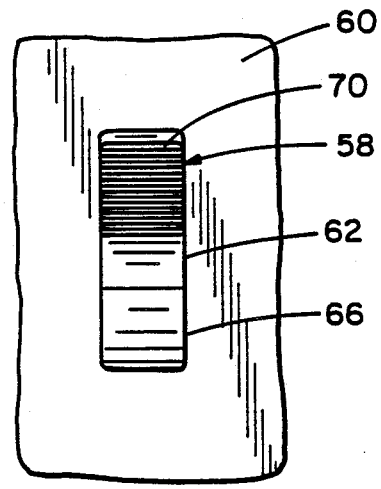
FIG. 6 is a plan view of a wall of a second structural component which carries a male connector component of the connector assembly.
Figures 7, 8:
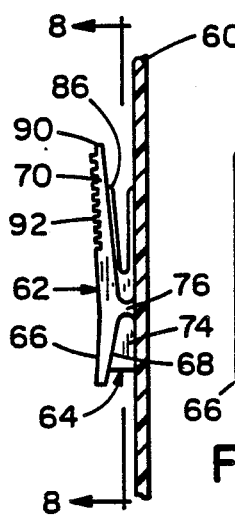
FIG. 7 is a side elevational view of the male connector component.
FIG. 8 is a sectional view of the male connector component taken generally along line 8—8 of FIG. 7.

Referring to FIGS. 6-8, the connector assembly also includes a male connector component 58 carried by a wall 60 of a second structural member. The male component includes a male member 62 for reception in the window 44, and a stem 64 joining the member 62 and the wall 60. The male member is resilient and includes a head 66 having an undersurface 68 for riding on the ramp surface 56 and a latching tail 70 extending rearwardly of the head. The female connector component 40 and the male connector 58 are preferably integral with the respective structural members carrying the components.

More specifically, the cam wall 54 is split by a longitudinal slot 72 and the stem 64 has a forward extension 74 for reception in the slot. The stem also preferably includes a transverse abutment 76 engageable with the cam wall to limit movement of the head 66 toward the window first end 44. Female connector component 40 also includes deflection means 78 positioned adjacent the window second end 48 and the inside surface 52 for deflecting the latching tail 70 as the head 66 is caused to slide up the cam wall 54 towards the window first end 46. This deflection means can be constituted by material of the female connector component defining a window 44.

The head 66 has an outside surface 80 and the tail 70 has an outside surface 82 with these surfaces being generally coplanar in the as-formed condition of the male connector component. The male member 62 has a length and width substantially equal to but slightly lesser than corresponding parameters of the window 44 so that, when the components 40 and 58 are coupled, the male member substantially fills the window. As best shown in FIGS. 4 and 5, the female component may include a pair of elongate strengthening ribs 84 flanking the window 44 and extending from the inside surface 52. These ribs 84 function to engage the wall 60 as the head 66 is moved up the ramp surface 56 to limit relative movement of the walls 42 and 60 toward each other thereby forcing deflection of the latching tail 70.

Figures 9, 10, 11, 12, 13:
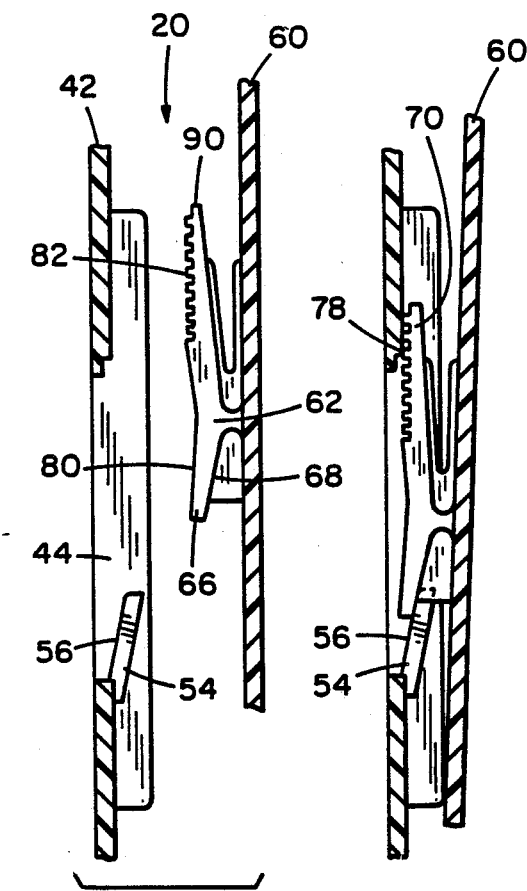
FIGS. 9-12 show progressive steps in the association and latching together of the male and female connector components.
FIG. 13, similar to FIG. 9, illustrates deflection of a latching tail of the male connector component in preparation for diassociation of the components of the connector assembly.

The portion of the tail disposed 70 rearwardly of the head 66 is not directly connected to wall 60 by the stem 64; however, a stiffening rib 86 may be provided on the undersurface of the tail to adjust its flexibility. The female component 40 includes a ledge 88 extending across the window adjacent the second end 48, with the ledge being recessed relative to the inside surface 52, as best shown in FIGS. 4 and 5. The distal end of the latching tail 70 has a rearward extension 90 recessed relative to the outside surface 82 of the tail. The extension 90 engages the ledge 88 when the male member is in its retained position, as shown in FIG. 12, to limit movement of the tail 70 toward the female connector component outside surface 50, so that outside surfaces 50, 80 and 82 are substantially coplanar to provide a neat appearance. The outside surface 82 of the latching tail can be provided with a series of regularly spaced transverse slots 92 to indicate to the user where to apply finger pressure to move the latching tail toward its release position as shown in FIG. 13, as well as to increase friction.

Referring to FIGS. 9-12, operation of the connector assembly 20 of the present invention is as follows: The head 66 of the male member 62 is inserted into the window 44 downstream of the cam wall 54, as suggested by FIG. 9. By sliding the undersurface 68 of the head 66 on the ramp surface 56 of the cam wall 54, the latching tail 70 is deflected toward the second wall 60. With continued movement of the head 66 toward the window first end 46 the tail 70 is moved towards it fully deflected position, as shown in FIG. 11. Finally, the tail passes the material defining the second end 48 of the window 44 thereby allowing the tail 70 to, due to its resiliency, return to its as-molded condition, as shown in FIG. 12. In this position, the male member 62 substantially entirely fills the window 44 with the tail 70 latching the male member against retrograde movement to securely and reliably couple together the structural members carrying the components of the connector assembly. When it is desired to disassociate these structural members, the user can simply exert finger pressure against the tail, as shown by the arrow in FIG. 13 to push the tail 70 out of the window 44 towards the wall 60. Then the user can cause the head 66 slide away from the window first end 46 to remove the head 66 from the window 44.

With respect to the major component of the hose cart 22 shown in FIG. 2, after the bearings 94 carried by the reel flanges 26 are positioned in the bearing surfaces 96 of the respective sides 30, 32, the sides can be joined by the tray 34, handle 36 and the reinforcing bar 38 using simply linear sliding movement. Disassociation of these major structural members is easily accomplished by moving the various latching tails towards their release position and reversing the just-described procedure. Other components of the hose cart 22 such as the crank 98 and the wheels 100 are connected in a conventional manner. It will be appreciated that, for purposes of simplified explanation, the various components used to connect the garden hose to a faucet for supplying water, are not shown.

As a method of assembling and disassembling major structural components of a portable hose cart 22, the present invention includes several steps:

(a) The head 66 of a male member of a male connector component is inserted into a window 44 defined by a female connector component so that the head is aligned to engage a cam wall 54 extending into the window.

(b) The head is caused to slide up the cam wall until a resiliently deflectable latching tail 70, extending rearwardly from the head, moves into the window to latch the male and female components together.

(c) When it is desired to disassemble the hose cart, the deflectable latching tail is pushed out of the window. and (d) The head is caused to slide down the cam wall thereby disassembling the male and female components.

Figure 14:
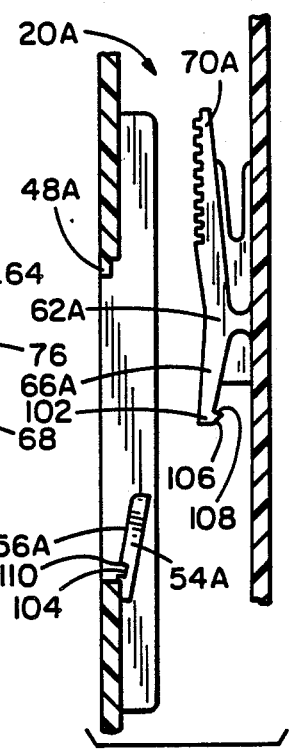
FIG. 14, also similar to FIG. 9, shows an alternative embodiment of a connector assembly embodying various features of the present invention in which the male connector component carries a locking tooth and the female connector component has a cavity for receiving the tooth when the components are mated.

Referring now to FIG. 14, an alternative embodiment of a connector assembly of the present invention is generally indicated by reference character 20A. Components of connector assembly 20A corresponding to components of the assembly 20 are indicated by the reference numeral assigned to the component of assembly 20 with the addition of the suffix "A". The main differences between the embodiment are that in connector assembly 20A, the head 66A of the male member 62A carries a dependent locking tooth 102, which is received in a cavity 104 formed in the ramp surface 56A of the cam wall 54A when the female connector component 40A and the male connector component 58A are mated. More specifically, the tooth 102 includes a leading surface 106 for riding on the ramp surface 56A as the components are moved toward their mating position. Tooth 106 also includes a trailing surface 108 for abutting a rear surface 110 defining the cavity 104 upon attempted retrograde movement of the head relative to the cam wall. In the connector assembly 20A, retrograde movement of the mated components is thus precluded adjacent the rear end of the male member by the tail 70A bearing against the second end 48A of the window 44A, and at the forward end of the head due to the reception of tooth 102 in the cavity 104. The locking tooth preferably extends the full width of the head 66A, and the shape of the cavity 104 generally corresponds to that of the tooth.

Operation of the connector assembly 20A generally corresponds to the operation of assembly 20 discussed above except that during association of the members, the leading surface 106 of the tooth 102 rides on ramp surface 56A until the tooth moves into alignment with the cavity. Release of the assembled components is effected by simply pressing down the tail 70A beneath the level of the window 44A. This also results in the male member pivoting on the stem 64A resulting in the tooth 102 being elevated out of the cavity so that the components can be released.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A connector assembly for releasably joining a first structural member and a second structural member, each said member having a wall and said connector holding said walls of said members in generally parallel overlapping relationship, said connector assembly comprising:

a female connector component carried by said first structural member and including a window having a first end and a second end, an outside surface and an inside surface, a cam wall disposed adjacent said first end and recessed with respect to said outside surface, and deflection means disposed adjacent said second end and said inside surface, said cam wall including a ramp surface converging with said outside surface away from said second end; and a male connector component carried by said second structural member and including a male member for reception in said window and a stem joining said male member and said second structural member, said male member being resilient and having a head with an undersurface for riding on said ramp surface and a tail extending rearwardly of said head, insertion of said head into said window and movement of said head on said cam wall toward said window first end causing said male member to be directed into said window toward said female component outside surface and further causing said deflection means to deflect said tail until said tail moves into said window past said deflection means at which time said tail moves toward said outside surface of said female component to retain said male member in said window thereby joining said first and second structural members.

2. A connector assembly as set forth in claim 1 wherein said female connector component and said first structural member are integral and of molded thermoplastic construction.

3. A connector assembly as set forth in claim 1 wherein said male connector component and said second structural member are integral and of molded thermoplastic construction.

4. A connector assembly as set forth in claim 1 wherein said window is elongated and said cam wall has a longitudinal slot, said stem having a forward extension for reception in said slot.

5. A connector assembly as set forth in claim 1 wherein said stem includes a transverse abutment engageable with said cam wall to limit movement of said male member toward said window first end.

6. A connector assembly as set forth in claim 1 wherein said first and second structural members include walls and wherein material of said female connector component defining said window constitutes said deflection means.

7. A connector assembly as set forth in claim 6 wherein said female connector component further includes at least one elongate strengthening rib extending from said inside surface, said rib engaging the second structural wall as said head is moved up said ramp surface to limit relative movement of the structural walls toward each other.

8. A connector assembly as set forth in claim 1 wherein said male member has a length and width substantially equal to but slightly lesser than corresponding parameters of said window so that said male member substantially fills said window.

9. A connector assembly as set forth in claim 1 wherein, with said male member in its retained position in said window, said outside surfaces of said head and tail and the outside surface of said female connector component are substantially coplanar.

10. A connector assembly as set forth in claim 1 wherein the portion of said tail disposed rearwardly of said head is not directly connected to said second structural member by said stem, whereby the distal end of said tail can be deflected away from said female connector outside surface so that said male member can be moved away from said window first end to release said male and female connector components.

11. A connector as set forth in claim 1 wherein said female connector component includes a ledge extending into said window adjacent said second end, said ledge being recessed relative to said female connector component inside surface, the distal end of said tail having a rearward extension recessed relative to the outside surface of said tail, said extension engaging said ledge when said male member is retained in said window to limit movement of said tail toward the outside surface of the female connector component.

12. A connector as set forth in claim 1 wherein said head carries a dependent locking tooth and wherein said cam wall includes a cavity for receiving said tooth when said male connector component and said female connector compartment are joined.

13. In combination, a first structural component including a wall carrying a female connector component and a second structural component including a wall carrying a male connector component, said connector components operating to hold walls in generally parallel, overlapping relationship;

said female connector component including a window having a first end and a second end, an outside surface and an inside surface, a cam wall extending into said window adjacent said first end and recessed from said outside surface, said cam wall including a ramp surface converging with said outside surface away from said second end;

said male connector component including a male member for reception in said window and a stem holding said male member spaced from said wall of said second structural component, said male member having a head with an undersurface for slidable engagement with said ramp surface and a resiliently deflectable latching tail extending rearwardly of said head, each of said head and said tail having outside surfaces, said tail being deflectable from an as-formed condition wherein the head and tail outside surfaces are substantially coplanar to a deflected position wherein said male connector component can be mounted on and dismounted from said female connector, said male member having a length substantially equal to the length of said window, whereby insertion of said head into said window and movement of said head on said cam wall toward said window first end causes said male member to be directed into said window toward said female connector component outside surface and results in movement of said tail toward said deflected position until said tail moves past said window second end permitting said tail to return toward its as-formed condition thereby latching together said male and female components.

14. A combination as set forth in claim 13 wherein first and second structural components are parts of a portable hose cart.

* * * * *

UNITED STATES PATENT AND TRADEMARK OFFICE
CERTIFICATE OF CORRECTION

PATENT NO. : 4,913,580
DATED : April 3, 1990
INVENTOR(S) : Stephen P. Whitehead

It is certified that error appears in the above-identified patent and that said Letters Patent is hereby corrected as shown below:

In the Abstract, line 19, after "have" delete --a--.

Column 2, line 40, after "2" insert a comma.

Column 2, line 61, change "diassociation" to --disassociation--.

Column 3, line 26, change "10" to --20--.

Column 4, line 10, after "tail" insert --70-- and after "disposed" delete "70".

Column 4, line 53, after "66" insert --to--.

Column 4, line 61, change "simply" to --simple--.

Column 5, line 17, after the period delete "and".

Column 7, line 26, change "compartment" to --component--.

Signed and Sealed this

Twenty-seventh Day of August, 1991

Attest:

HARRY F. MANBECK, JR.

Attesting Officer

Commissioner of Patents and Trademarks